US012335554B2

(12) United States Patent
    Dalal

(10) Patent No.: US 12,335,554 B2
(45) Date of Patent: Jun. 17, 2025

(54) DIRECT MEDIA CONNECTION OF A REAR-SEAT ENTERTAINMENT UNIT

(71) Applicant: HARMAN INTERNATIONAL INDUSTRIES, INCORPORATED, Stamford, CT (US)

(72) Inventor: Gayatri Dalal, Maharashtra (IN)

(73) Assignee: Harman International Industries, Incorporated, Stamford, CT (US)

( * ) Notice: Subject to any disclaimer, the term of this patent is extended or adjusted under 35 U.S.C. 154(b) by 3 days.

(21) Appl. No.: 17/727,500

(22) Filed: Apr. 22, 2022

(65) Prior Publication Data
    US 2022/0360838 A1   Nov. 10, 2022

Related U.S. Application Data

(60) Provisional application No. 63/183,903, filed on May 4, 2021.

(51) Int. Cl.
    *H04N 21/414*    (2011.01)
    *H04N 21/234*    (2011.01)
    *H04N 21/4363*   (2011.01)

(52) U.S. Cl.
    CPC . *H04N 21/41422* (2013.01); *H04N 21/23418* (2013.01); *H04N 21/43637* (2013.01)

(58) Field of Classification Search
    CPC ....... H04N 21/41422; H04N 21/23418; H04N 21/43637; H04L 65/1069; H04L 65/61; H04L 69/24; H04W 8/005; H04W 76/14; H04W 84/12
    See application file for complete search history.

(56) References Cited

U.S. PATENT DOCUMENTS

| 8,670,763 | B1 * | 3/2014 | Oroskar ............ H04W 36/0061 |
| | | | 455/437 |
| 9,306,924 | B2 | 4/2016 | Lehmann |
| 2002/0032048 | A1 * | 3/2002 | Kitao ..................... H04N 7/148 |
| | | | 348/E7.079 |
| 2009/0325642 | A1 * | 12/2009 | Schuler ................. G06F 3/1454 |
| | | | 455/566 |
| 2014/0033257 | A1 * | 1/2014 | Hjelmstedt ............. H04W 4/50 |
| | | | 725/51 |
| 2015/0172757 | A1 * | 6/2015 | Kafle ............... H04N 21/43637 |
| | | | 725/81 |
| 2016/0323863 | A1 * | 11/2016 | Park ........................ H04W 4/70 |

(Continued)

OTHER PUBLICATIONS

MIRACAST—Wi-Fi Alliance, "High-definition content sharing on Wi-Fi devices everywhere", 2022, 3 pages.

*Primary Examiner* — John W Miller
*Assistant Examiner* — Akshay Doshi
(74) *Attorney, Agent, or Firm* — Artegis Law Group, LLP

(57) ABSTRACT

Embodiments of the present disclosure set forth a computer-implemented method comprising a mobile device transmitting a discovery request message, identifying, based on a set of discovery response messages associated with the discovery request message, a set of rear-seat entertainment (RSE) units that are available for establishing a direct wireless communications link, generating a first direct wireless communications link with a first RSE unit from the set of RSE units, and streaming, from the mobile device to the first RSE unit via the first direct wireless communications link, media content for playback by the first RSE unit.

20 Claims, 9 Drawing Sheets

(56) References Cited

U.S. PATENT DOCUMENTS

| | | | |
|---|---|---|---|
| 2018/0004372 A1* | 1/2018 | Zurek | G06F 3/167 |
| 2018/0083899 A1* | 3/2018 | Sumter | G06F 3/167 |
| 2018/0084418 A1* | 3/2018 | Walsh | H04W 12/041 |
| 2021/0072373 A1* | 3/2021 | Schoenberg | G01S 13/765 |
| 2022/0053578 A1* | 2/2022 | Schodet | H04W 4/80 |

* cited by examiner

DIRECT MEDIA CONNECTION OF A REAR-SEAT ENTERTAINMENT UNIT

CROSS-REFERENCE TO RELATED APPLICATIONS

This application claims the priority benefit of the U.S. Provisional Patent application titled, "Direct Media Connection of a Rear-Seat Entertainment Unit," filed on May 4, 2021, and having Application Ser. No. 63/183,903. The subject matter of this related application is hereby incorporated herein by reference in its entirety.

BACKGROUND

Field of the Various Embodiments

Embodiments disclosed herein relate to vehicle entertainment systems and, in particular, a direct media connection of a rear-seat entertainment (RSE) system.

Description of the Related Art

Various vehicles include vehicle entertainment systems, such as in-car entertainment (ICE) or in-vehicle infotainment (IVI) systems, which include various hardware and software components that enhance the driver and passenger experience by providing audio or video entertainment, video gaming capability, Internet connectivity, and associated features to passengers and drivers. A common component of a vehicle entertainment system is a rear-seat entertainment (RSE) unit, which is configured for a rear passenger and is typically mounted in a front seat, including a display that is viewable by a user in a rear seat positioned behind where the RSE unit is mounted. Typically, each of the RSE units in a given vehicle entertainment system are connected to a central hub, such as a head unit mounted near the driver seat and/or within the dashboard of the vehicle. The head unit controls the media content that each of the RSE units present to a user.

One drawback of conventional vehicle entertainment systems is that the centralized head unit employed to control the RSE units is usually at positions that are inconvenient to a user. Because the head unit controls the media that a given RSE unit presents, an RSE-unit user is required to request other occupants interact with the head unit on behalf of the RSE-unit user. For example, an RSE-user located in the back seat could request that the driver or another passenger proximate to the head unit interact with the head unit modify the media content that the RSE unit is presenting. Another drawback of conventional vehicle entertainment systems is that connecting an external media source, such as a media player or mobile phone, to play media would require a connection of the external media source to the head unit, where the head unit acts as a middle link between the external media source and the RSE unit. Such a requirement causes difficulty in controlling the output of the RSE unit, as the use of a middle link device causes a delay in the RSE unit responding to controls made on the external media source, such as pressing a pause button on the mobile phone. Further, head units usually support only one external connection at a time, limiting the ability of multiple users within a given vehicle to control multiple RSE units.

In light of the above, more effective techniques for displaying media content via a rear-seat entertainment unit would be useful.

SUMMARY

Embodiments of the present disclosure set forth a computer-implemented method comprising a mobile device transmitting a discovery request message, identifying, based on a set of discovery response messages associated with the discovery request message, a set of rear-seat entertainment (RSE) units that are available for establishing a direct wireless communications link, generating a first direct wireless communications link with a first RSE unit from the set of RSE units, and streaming, from the mobile device to the first RSE unit via the first direct wireless communications link, media content for playback by the first RSE unit.

Various embodiments of the present disclosure also set forth a rear-seat entertainment (RSE) system comprising one or more output devices to provide media content, a memory storing a media application, and a processor that executes the media application by performing the steps of receiving a discovery request message transmitted from a mobile device proximate to the RSE system, transmitting a discovery response message to the discovery request message, establishing a first direct wireless communications link with the mobile device, receiving, from the mobile device via the first direct wireless communications link, a stream of the media content, and providing, the stream of the media content via the one or more output devices.

Further embodiments provide, among other things, non-transitory computer-readable storage media storing instructions for implementing the method set forth above, as well as a system configured to implement the method set forth above.

At least one technological advantage of the disclosed approach relative to the prior art is that establishing direct media connections between a mobile device and one or more rear-seat entertainment units reduces the complexity and cost of connecting such devices through a middle link unit, such as a head end unit. Further, by providing the user with a list of candidate RSE units with which a mobile device can connect, the direct media communication system provides a user with greater control to connect to specific RSE units within a group of RSE units. The disclosed approach enables the user to control connections without requiring the user control connections via a head unit that is typically positioned in an inconvenient location for the user. In addition, a system employing the disclosed approach enables a user to directly manage the output of connected RSE units without the use of a centralized head unit. These technical advantages provide one or more technological advancements over prior art approaches.

BRIEF DESCRIPTION OF THE DRAWINGS

So that the manner in which the above recited features of the various embodiments can be understood in detail, a more particular description of the inventive concepts, briefly summarized above, can be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one skilled in the art that the inventive concepts can be practiced without one or more of these specific details.

Overview

Embodiments disclosed herein include a direct media communication system that includes a mobile device and one or more rear-seat entertainment (RSE) units, where the mobile device establishes a direct wireless connection with at least one RSE unit. Each of the RSE units is configured to establish direct wireless connections with other devices within a given proximity. For example, each of the RSE units could support a wireless connection with at least one other device, where the wireless connection employs a peer-to-peer Wi-Fi standard (e.g., Wi-Fi Certified Miracast™).

When a mobile device initiates the establishment of a session with one or more RSE units, the mobile device can receive one or more messages in response to a device discovery request message. Based on the received messages, the mobile device can generate a peer list that includes the set of RSE units. The mobile device provides the peer list to the mobile user and receives a selection indicating one or more specific RSE units to which the mobile device is to establish a direct connection. In various embodiments, the mobile device can order the RSE units listed in a peer list based on various criteria, such as the order in which the RSE units responded to the discovery message. In some embodiments, the mobile device can order entries of the peer list based on a computed likelihood that a given RSE unit will be chosen to establish the connection.

Upon receiving an indication of the selections made by the mobile user, the mobile device and respective selected RSE units communicate to establish the one or more direct wireless connections. In various embodiments, establishing a given direct wireless connection can include determining the capabilities of the selected RSE units to display audio and/or video content (e.g., audio codecs, video resolution, audio output, etc.). Additionally or alternatively, establishing the session can include setting up the characteristics of the connection, including how content is protected, how messages are encrypted, and whether a back channel is established. Once the one or more direct wireless connections are established, the media device transmits one or more media streams to the one or more selected RSE units. During the streaming session, a user can control the media using controls via the RSE unit or the mobile device.

System Overview

Figure 1:
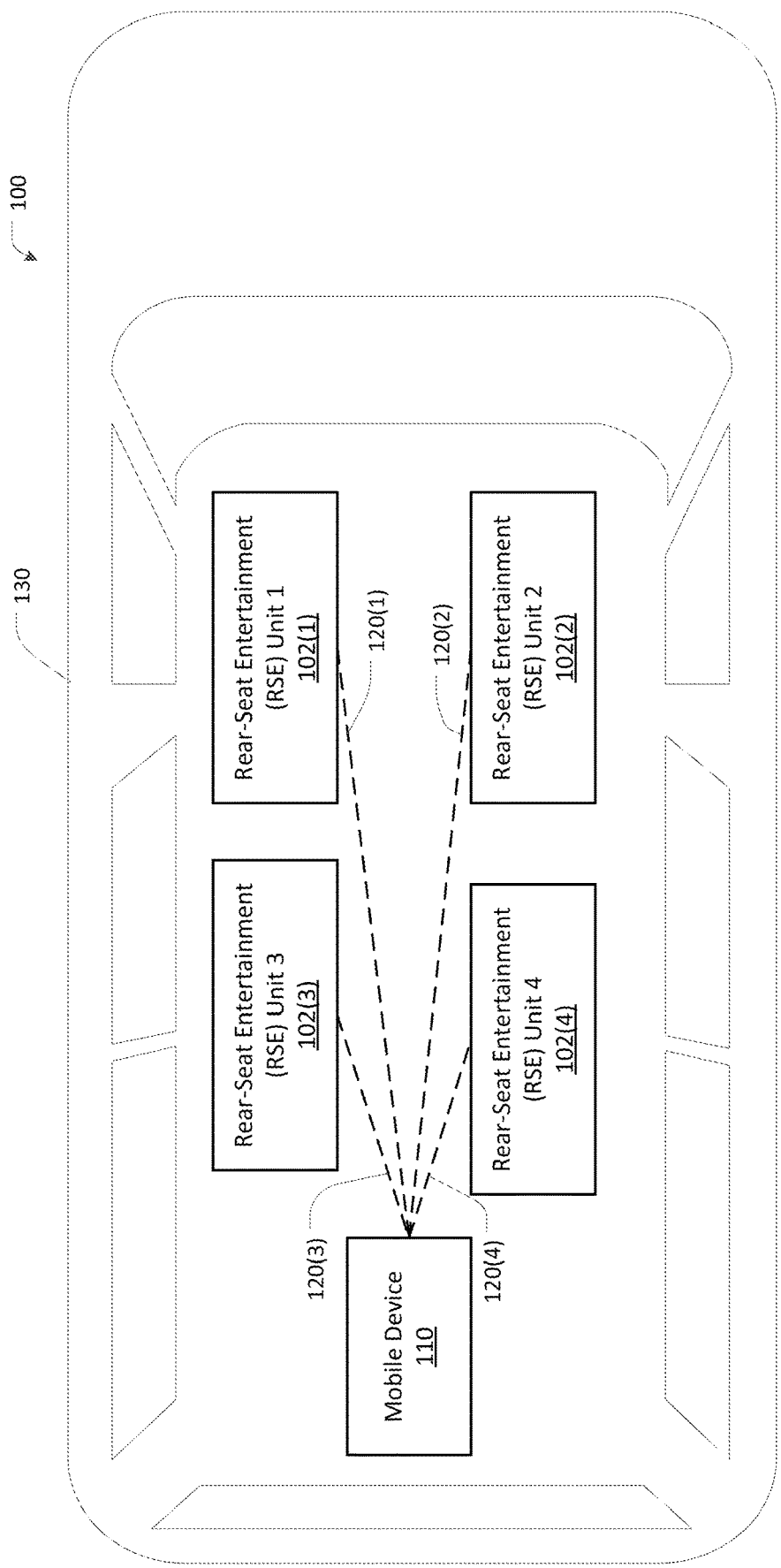
FIG. 1 illustrates a direct media communication system, according to one or more embodiments.

FIG. 1 illustrates a direct media communication system, according to one or more embodiments. As shown, and without limitation, the direct media communication system 100 includes a set of rear-seat entertainment (RSE) units 102 (e.g., 102(1), 102(2), etc. a mobile device 110, a set of direct communication links 120 (e.g., 120(1), 120(2), etc.), and a vehicle 130.

For explanatory purposes, multiple instances of like objects are denoted with reference numbers identifying the object and additional numbers identifying the instance where needed (e.g., the RSE unit 102(1)). Further, the direct media communication system 100 includes multiple instances of devices, even when not shown.

In operation, the mobile device 110 located in the vehicle 130 establishes at least one direct communication link 120 with an RSE unit 102 within the vehicle 130. The mobile device 110 establishes the direct communication links 120 in order to stream media content to one or more particular RSE units 102 (e.g., the RSE unit 102(4)), where a particular RSE unit 102(4) presents the content in lieu of the mobile device 110. In some embodiments, the mobile device 110 can discover one or more RSE units 102 in a given area. In such instances, the mobile device 110, based on a selection of one or more specific RSE units 102 (e.g., the RSE unit 102(3)) indicated by a user of the mobile device 110, can establish the one or more direct communications links 120 (e.g., the direct communications link 120(3)) with the one or more corresponding RSE units 102(3)).

The rear-seat entertainment (RSE) units 102 (e.g., 102(1), 102(2), 102(3), 102(4), etc.) are components of a vehicle entertainment system that provide media content, such as audio data, video data, image data, and so forth, via one or more output devices. In various embodiments, multiple RSE units 102 can be grouped within a specific area, such as a row of RSE units 102 (e.g., the RSE units 102(1), 102(2)) within the vehicle 130. In some embodiments, the RSE units 102 can be included in other vehicles. For example, the RSE units 102 could be separate units included in an airplane, bus, van, boat, train, or similar vehicle that includes multiple seats.

In some embodiments, the one or more RSE units 102 can be connected to a head unit (not shown) that includes an entertainment subsystem that controls the one or more RSE units 102. In such instances, the mobile device 110 can connect to the head unit in order to control the media content that a given RSE unit 102 displays.

In various embodiments, the RSE unit 102 can be a device that acts as a node in a wireless network. For example, the RSE unit 102(4) can be a member of a Wi-Fi network. In such instances, the mobile device 110 can establish a direct wireless connection (e.g., forming the direct communications link 120(4) as a Wi-Fi Direct connection) with the RSE unit 102(4). In such instances, the mobile device 110 can form a direct connection with the RSE unit 102(4) in order to directly control the output of the RSE unit 102(4) without requiring a connection to the head unit, as the head unit can be mounted in an inconvenient location relative to the mobile device 110. For example, a taxi vehicle or ride-share vehicle can include a head unit mounted in the front of a passenger compartment of the vehicle 130. When a user of the mobile device 110 is in the back seat of the passenger compartment, the user can cause the mobile device 110 to establish a direct wireless connection with the RSE unit 102(4) in lieu of requiring the driver to connect the mobile device to the head unit.

The mobile device 110 includes one or more processors and memory subsystems. The processor can run user processes, such as a media control application that enables the user to playback media content. In various embodiments, the mobile device 110 can connect to a given RSE unit 102 via a direct wireless communications link that enables the mobile device 110 to transport large files, objects, and/or other messages associated with a particular media content item. In some embodiments, the mobile device 110 can be one or more portable device such as cellphones, tablets, laptops, wearable devices (e.g., watches, rings, bracelets, headphones, etc.), consumer products (e.g., portable speakers, digital assistants, media players, etc.), and so forth.

In various embodiments, the mobile device 110 can determine that more than one RSE unit 102 is available to establish a direct communications link 120. In such instances, the mobile device 110 can provide to the user a candidate list of available RSE units 102. In such instances, the user can then provide an indication of selections for one or more specific RSE units 102 from the candidate list. The mobile device 110 can then respond by attempting to establish the direct communications links 120 with the respective selected RSE units 102. In some embodiments, the mobile device 110 may attempt to establish the direct communications link 120 only after receiving a confirmation message from the selected RSE unit 102 that the user picked the specific RSE unit 102.

For example, a user could attempt to connect to an RSE unit 102 directly in front of her. The user can misidentify the RSE unit desired for connection as the RSE unit 102(1) instead of the RSE unit 102(4). The user can then provide an input to the mobile device 110 that selects the RSE unit 102(1) from a displayed candidate list. Upon receiving the user selection, the mobile device 110 can send a message to the RSE unit 102(1) that requests a confirmation input on the screen of the RSE unit 102(1). At this stage, the user may determine that the confirmation message is displayed on the incorrect RSE unit and can then directly cancel the connection to RSE unit 102(1). Alternatively, the confirmation message displayed on the RSE unit 102(1) can expire before the user provides a confirmation input.

The direct communications links 120 (e.g., 120(1), 120(2), 120(3), 120(4), etc.) are potential communications links that can be established between the mobile device 110 and the one or more RSE units 102 included in the vehicle 130. In various embodiments, the mobile device 110 can establish at least one direct communications link 120 with at least one RSE unit 102 and can control a media stream transmitted to the at least one RSE unit 102. For example, a user can initiate the establishment of the direct communications link 120(4) between the mobile device 110 and the RSE unit 102(4). In such instances, the mobile device 110 can transmit one or more control messages associated with the control of a media stream via the established direct communications link 120(4). The control of the media stream can include playback controls, output device controls (e.g., brightness, volume, etc.), and/or an indication of which content item the RSE unit 102(4) is to present.

Figure 2:
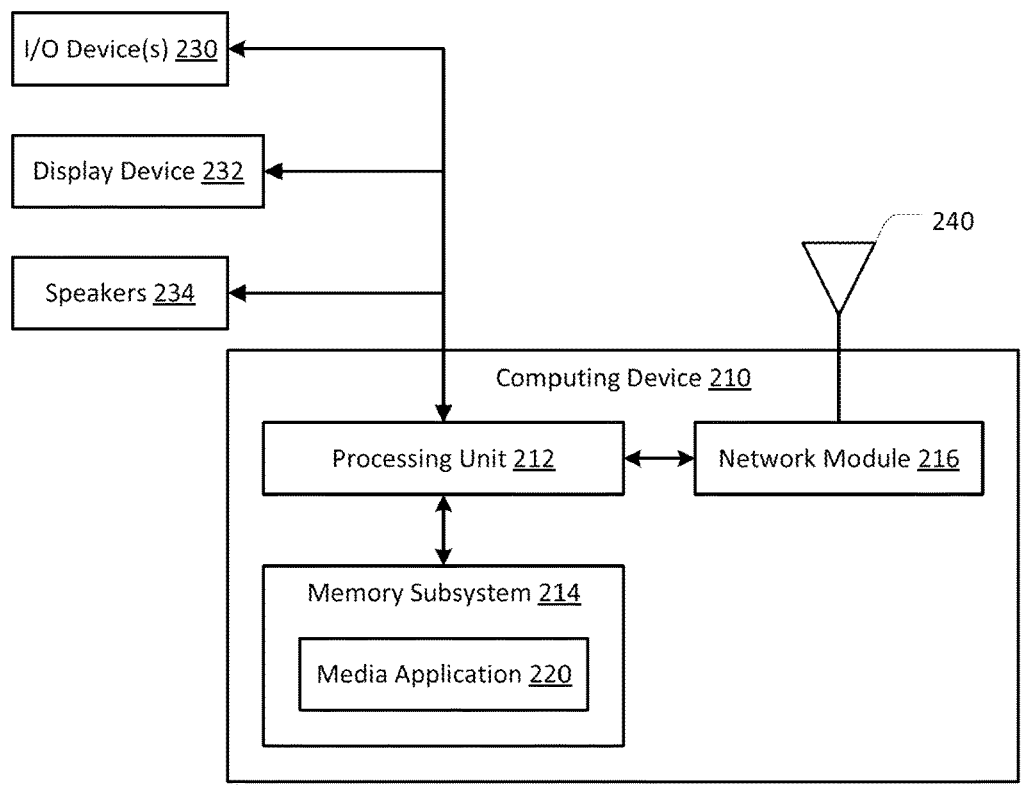
FIG. 2 illustrates components of a rear-seat entertainment unit that is included in the example direct media communication system of FIG. 1, according to one or more embodiments.

FIG. 2 illustrates components of an RSE unit 200 that is included in the example direct media communication system 100 of FIG. 1, according to one or more embodiments. As shown, and without limitation, the RSE unit 200 includes a computing device 210, one or more input and output (I/O) devices 230, a display device 232, one or more speakers 234 and a transceiver 240. The computing device 210 includes, without limitation, a processing unit 212, a memory subsystem 214, and a network module 216. The memory subsystem includes, without limitation, a media application 220.

In operation, the processing unit 212 establishes the direct communications link 120 with the mobile device 110 via the network module 216 and the transceiver 240. The processing unit 212 further executes the media application 220 in order to provide media content via the one or more I/O devices 230, the display device 232, and/or speakers 234. For example, the media application 220 could cause the RSE unit 102 to communicate with a mobile device 110 in order to establish a direct communications link 120 and receive a media stream from the mobile device 110.

The computing device 210 includes a processing unit 212 and a memory subsystem 214. In various embodiments, the computing device 210 can be a device that includes one or more processing units 212, such as a system-on-a-chip (SoC). In some embodiments, the RSE unit 200 can be mounted or attached to a seat using one or more attachment devices (not shown). In such instances, the computing device 210 can include a portable computing device, such as a tablet computer, media player, and so forth, that can be attached to the seat within the vehicle 130. Generally, the computing device 210 can be configured to coordinate the overall operation of the direct media communication system 100.

In various embodiments, the processing unit 212 can include a central processing unit (CPU), a digital signal processing unit (DSP), a microprocessor, an application-specific integrated circuit (ASIC), a neural processing unit (NPU), a graphics processing unit (GPU), a field-programmable gate array (FPGA), and so forth. The memory subsystem 214 can include a memory module or collection of memory modules. The media application 220 within the memory subsystem 214 can be executed by the processing unit 212 to implement the overall functionality of the computing device 210 and, thus, to coordinate the operation of the direct media communication system 100 as a whole. In various embodiments, the media application 220 controls the playback of media content via the media device 110 and/or the RSE unit 200.

The transceiver 240 is connected to the computing device 210 and is configured to transmit and/or receive data packets and/or other messages across the communications link 120. The network module 216 includes one or more network interfaces that enable communications between the computing device 210 and other devices via wired and/or wireless communications protocols, satellite networks, Bluetooth, Bluetooth low energy (BLE), wireless local area network (WLAN), Wi-Fi, cellular protocols, and/or near-field communications (NFC). In some embodiments, the network module 216 can be hardware, software, or a combination of hardware and software, which is configured to connect to an interface with other devices directly or via a network. Additionally or alternatively, the network module 216 can be a separate attachment that connects to the computing device 210. For example, the computing device 210 can include one or more connection ports (e.g., High-Definition Multimedia Interface (HDMI) ports, Universal Serial Bus (USB) ports, etc.). The network module 216 could be included in an external dongle that connects to the computing device 210 via one of the connection ports (e.g., a USB dongle) in order to support wireless connections using one or more wireless communications protocols.

Figure 3:
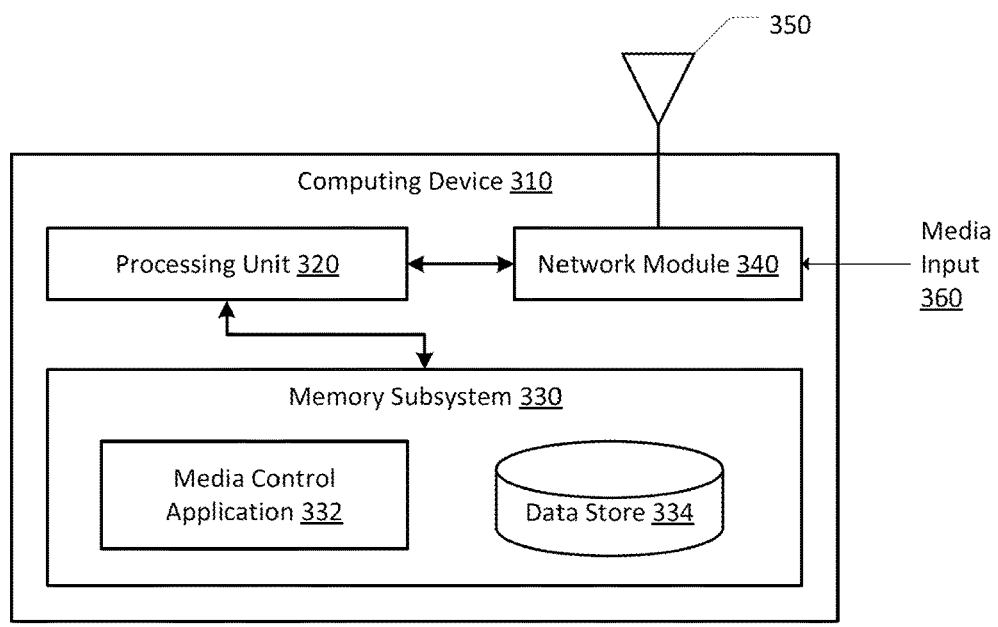
FIG. 3 illustrates components of a mobile device unit that is included in the example direct media communication system of FIG. 1, according to one or more embodiments.

FIG. 3 illustrates components of a mobile device unit 300 that is included in the example direct media communication system 100 of FIG. 1, according to one or more embodiments. As shown, and without limitation, the mobile device unit 300 includes a computing device 310 and a transceiver 350. The computing device 210 includes, without limitation, a processing unit 320, a memory subsystem 330, and a network module 340. The memory subsystem includes, without limitation, a media control application 332 and a data store 334.

In operation, the processing unit 320 establishes one or more direct communications links 120 with at least one RSE unit 102 via the network module 340 and the transceiver 350. The processing unit 320 further executes the media control application 332 in order to control the one or more direct communications links 120 and provide media content for the one or more RSE units 102 to present.

The computing device 210 can include a processing unit 212 and a memory subsystem 214. The computing device 110 can be a device that includes one or more processing units 212, such as a system-on-a-chip (SoC), or a mobile computing device, such as a tablet computer, media player, and so forth. Generally, the computing device 210 can be configured to coordinate the overall operation of the direct media communication system 100. The processing unit 320 can include a central processing unit (CPU), a digital signal processing unit (DSP), a microprocessor, an application-specific integrated circuit (ASIC), a neural processing unit (NPU), a graphics processing unit (GPU), a field-programmable gate array (FPGA), and so forth.

The memory subsystem 330 can include a memory module or collection of memory modules that store the media control application 332 and the data store 334. The media control application 332 within the memory subsystem 330 can be executed by the processing unit 320 to implement the overall functionality of the computing device 210 and, thus, to coordinate the operation of the direct media communication system 100 as a whole.

In various embodiments, the media application 220 controls the playback of media content via the media device 110 and/or the RSE unit 200. For example, the media control application 332 could cause the mobile device 110 to present a candidate list of available RSE units 102 that are proximate to the mobile device 110. The media control application 332 could then respond to a selection of a specific RSE unit 102 by communicating with the selected RSE unit 102 in order to establish the direct communications link 120 and transmit a media stream for playback.

Transceiver 350 is connected to the computing device 310 and is configured to transmit and/or receive data packets and/or other messages across the direct communications link 120. The network module 340 includes one or more network interfaces that enable communications between computing device 210 and other devices via wired and/or wireless communications protocols, satellite networks, including Bluetooth, Bluetooth low energy (BLE), wireless local area network (Wi-Fi), cellular protocols, and/or near-field communications (NFC). In some embodiments, network module 340 is hardware, software, or a combination of hardware and software, which is configured to connect to an interface with other devices directly or via a network.

In various embodiments, the media control application 332 can cause a media stream that forwards a media input 360 from one or more sources. In one example, the media content could be stored locally in the data store 334. In another example, the media control application 332 could communicate with a remote content source in order to access remote content items via streaming and/or download. In such instances, the network module 340 can establish a second communications link to the content source (via a network) in addition to the direct wireless communication link 120 that is established with the selected RSE unit 102.

Direct Media Connection of a Rear-Seat Entertainment Unit

Figure 4:
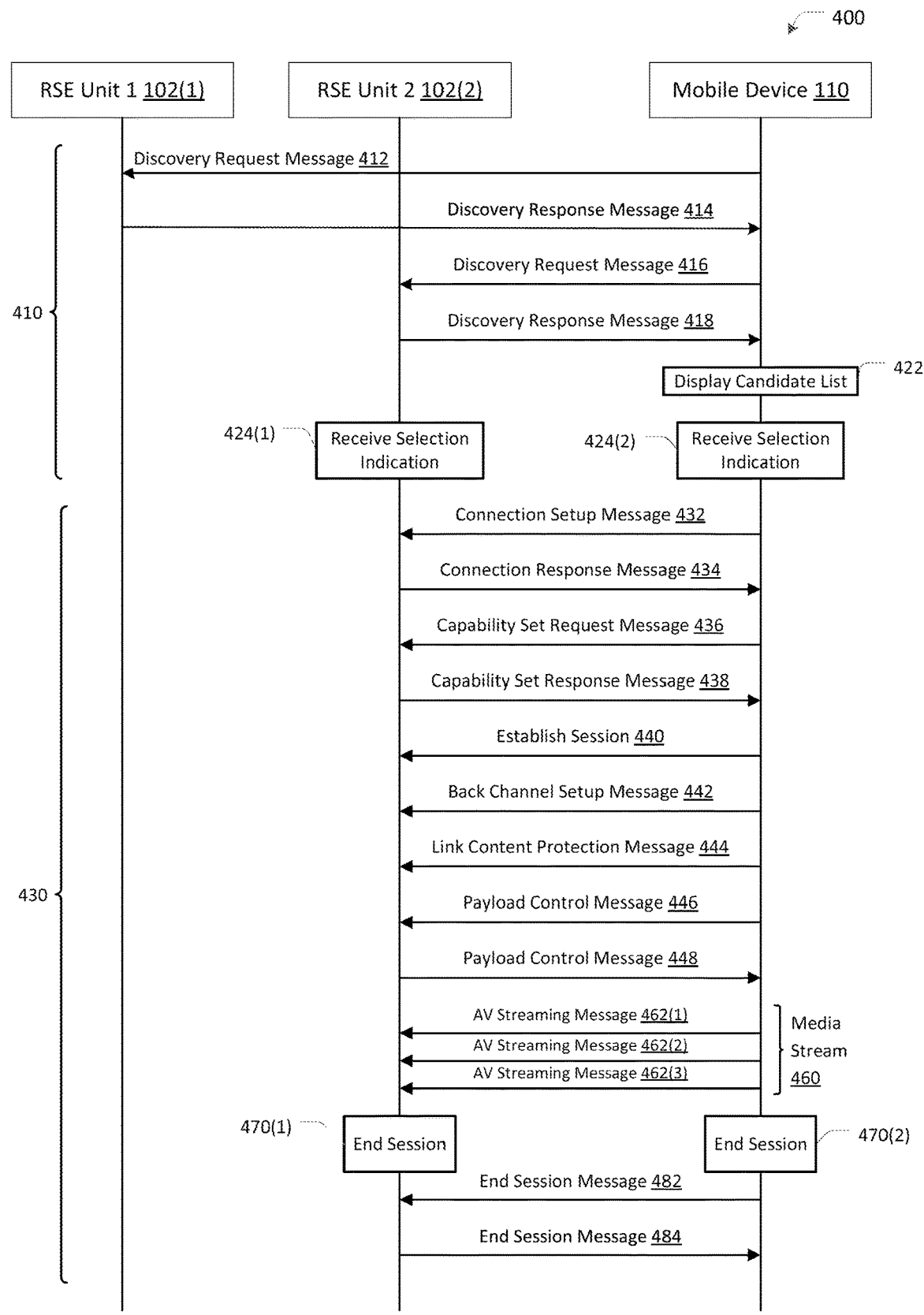
FIG. 4 illustrates an interaction diagram showing interactions between various components of the example direct media communication system of FIG. 1, according to one or more embodiments.

FIG. 4 illustrates an interaction diagram 400 showing interactions between various components of the example direct media communication system 100 of FIG. 1, according to one or more embodiments. One or more components of the direct media communication system 100 can perform various operations to establish a direct wireless connection in order to stream media content via the direct wireless connection. Although the interactions between devices are shown in an order, persons skilled in the art will understand that the interactions may be performed in a different order, interactions may be repeated or skipped, and/or may be performed by components other than those described in FIG. 4.

As shown in FIG. 4, the mobile device 110 performs the selection process 410 by interacting with one or more RSE units 102. During the selection process 410, the mobile device 110 transmits one or more discovery request messages 412, 416 that are received by separate RSE units 102(1), 102(2). For example, the mobile device 110 could receive an input made by a user of the mobile device 110 to initiate streaming to a RSE unit 102. The mobile device 110 can respond to the input by generating and transmitting one or more discovery request messages 412, 416. The one or more RSE units 102 that are proximate to the mobile device 110 receive the respective discovery request messages 412, 416. In various embodiments, the discovery request message 412, 416 can correspond to a specific type of discovery request that is based on the type of direct wireless connection that is to be established and/or the protocol supported by the respective devices. For example, the media control application 332 included in the mobile device 110 could generate the discovery request messages 412, 416 as Wi-Fi Direct Device discovery request messages that initiate the creation of a Wi-Fi peer-to-peer (Wi-Fi P2P), a Wi-Fi infrastructure mode, or a tunneled direct link setup (TDLS) connection. In some embodiments, the connection created can be based on the interface (e.g., interface R1-R8 WiMAX interface types) supported by a device. For example, when the TDLS connection is used, the respective device can maintain a connection with an access point (AP) for the Wi-Fi network. In another example, when the Wi-Fi infrastructure mode is used, the respective devices connect within the same IP network.

In some embodiments, the mobile device 110 can broadcast a single message (e.g., the discovery request message 412) that each RSE unit 102 separately receives. In other embodiments, the mobile device 110 can generate separate discovery request messages (e.g., the discovery request messages 412, 416) for multiple RSE units 102 within a given area. For example, the mobile device 110 can initially receive a message with a list of the RSE units 102 (e.g., the RSE units 102(1)-102(4) that are within a given area or from a head unit). The mobile device 110 could respond to the list by generating a separate discovery request message for each listed RSE unit 102 in order to confirm that each of the RSE units 102 is available for establishing a streaming session. Additionally or alternatively, the mobile device 110 can send discovery request messages to various combinations of devices within the vehicle 130. For example, the mobile device 110 can send discovery response messages to each RSE unit 102, as well as the head unit and/or other components (e.g., speakers, headsets, etc.) within the vehicle 130.

The one or more RSE units 102 (e.g., 102(1), 102(2)) proximate to the mobile device 110 respond to received discovery request messages 412, 416 by transmitting discovery response messages 414, 418 to the mobile device 110. In various embodiments, the respective RSE units 102(1), 102(2) can respond to receiving the respective discovery request messages 412, 416 by transmitting a discovery response message 414, 418. In such instances, the discovery response messages 414, 418 indicate that the transmitting RSE units 102(1), 102(2) are available for establishing a streaming session. Alternatively, in some embodiments, the one or more RSE units 102 can periodically broadcast availability messages. In such instances, the mobile device 110 can process the received availability messages in lieu of transmitting the discovery request messages 412, 416 and processing the corresponding discovery response messages 414, 418.

In some embodiments, the RSE unit 102 can refrain from transmitting the discovery response message 414, 418 when linked to a separate device. For example, the RSE unit 102(1) could have an established direct wireless connection with a separate mobile device (not shown). In such instances, the RSE unit 102(1) could receive the discovery request message 412 and refrain from transmitting the discovery response message 414, indicating that the RSE unit 102(1) is unavailable for establishing a direct connection.

Upon receiving the discovery response messages 414, 418, the mobile device 110 performs various actions 422 to display a candidate list of the RSE units 102 to which the mobile device 110 can establish a direct connection. In various embodiments, the mobile device 110 can generate a list of candidate RSE units 102(1), 102(2). The list corresponds to the set of discovery response messages 414, 418 that the mobile device 110 receives. In various embodiments, the mobile device 110 can order the entries of the candidate list using various criteria. For example, the media control application 332 included in the mobile device 110 could compute a probability value that the user of the mobile device 110 will select a given RSE unit 102 to establish a direct connection. Such a probability value could be based on various metrics associated with a streaming session, such as response time, estimated distance to the mobile device 110, estimated connection strength, hardware capabilities (e.g., type of audio output device, display screen resolution, etc.), and so forth. The media control application 332 could then order the candidate list by listing the RSE units 102 most likely to be selected in descending order based on the computed probability values for the respective RSE units 102.

After the mobile device 110 provides the candidate list of RSE units 102, the mobile device 110 and/or the one or more selected RSE units 102 (e.g., 102(2)) can perform actions 424 (e.g., 424(1), 424(2)) associated with receiving a confirmation of a selected unit from the candidate list. In some embodiments, the user of the mobile device 110 can provide an input via the mobile device 110 and/or the one or more selected RSE units 102 confirming that the one or more specific RSE units 102 were correctly selected from the candidate list.

In one example, the mobile device 110 could initially receive a user input indicating the selection of the RSE unit 102(2) and could respond by performing an action 424(2), such as transmitting a connection message (not shown) to the RSE unit 102(2). In another example, one or more of the respective RSE units 102 could generate a unique pairing code. The user of the mobile device 110 could indicate a selection of the RSE unit 102(2) by inputting the pairing code for the RSE unit 102(2) at the mobile device 110.

Additionally or alternatively, the selected RSE unit 102(2) can separately receive a user input confirming that the user of the mobile device 110 selected the RSE unit 102(2). For example, the media application 220 included in the RSE unit 102(2) could require a separate input at the RSE unit 102(2) provided by the user indicating a confirmation (e.g., requiring pressing a confirmation button) of the RSE 102(2) as at least one of the selected RSE units 102 before establishing the direct connection. Requiring confirmation at the RSE unit 102(2) could enable the user to confirm that the correct RSE unit 102(2) is being selected from the candidate list. In such instances, the user can provide separate inputs to each of the mobile device 110 and the one or more selected RSE units 102 before the devices establish the streaming session.

In various embodiments, the mobile device 110 and each of the respective selected RSE units 102 and/or other components can exchange various messages during the streaming session 430 to configure the one or more direct wireless connections and stream content over the one or more direction wireless connections. Though the interaction diagram 400 illustrates messages exchanged between the mobile device 110 and a single selected RSE unit 102, other embodiments include the mobile device 110 exchanging multiple messages with multiple selected components. For example, the mobile device 110 can exchange messages with multiple selected RSE units 102 and a head unit during the same streaming session.

During the streaming session 430, the selected RSE unit 102(2) and the mobile device 110 can exchange various messages in order to establish the parameters of the streaming session and subsequently have content streamed via a direct wireless connection. For example, the mobile device 110 could transmit a connection setup message 432 to the selected RSE unit 102(2) and the selected RSE unit 102(2) can respond by transmitting a connection response message 434.

In various embodiments, the mobile device 110 can transmit a connection setup message 432 that includes information about the direct wireless connection that is to be established. Such information includes whether the devices 110, 102(2) are members of a common Wi-Fi network, whether the direct communication link 120(2) is a Wi-Fi P2P or a TDLS link, and whether the RSE unit 102(2) is a sink (e.g., Wi-Fi Direct sink, Wi-Fi member) or a source (e.g., Wi-Fi group owner, Wi-Fi Direct source). For example, the mobile device 110 could determine that the RSE unit 102(2) is not a member of a Wi-Fi network. In such instances, the mobile device 110 can form a new group and assign itself as the group owner. The mobile device 110 could then transmit a connection setup message 432 to establish a Wi-Fi P2P-based direct communication link 120(2) that is to be used for streaming of media content. The RSE unit 102(2) could respond to receiving the connection setup message 432 by transmitting a connection response message 434 that confirms the details specified in the connection setup message 432. Other embodiments include the RSE unit 102(2) acting as the group owner of a Wi-Fi network. In such instances, the mobile device 110 can join the same Wi-Fi network as the selected RSE unit 102(2) and respond to connection setup messages 432 transmitted by the RSE unit 102(2).

During the establishment of the streaming session 430, the mobile device 110 and the selected RSE unit 102(2) can negotiate the capabilities of the direct wireless connection and/or the media streaming session. In various embodiments, the mobile device 110 can transmit a capability set request message 436 that requests a set of optional, recommended, and/or mandatory features of the direct wireless connection and/or the media streaming session. The RSE unit 102(2) can respond with a capability set response message 438 that details the selections made by the RSE unit 102(2) to the optional and recommended features, and/or confirmation of compliance with respect to mandatory features. In various embodiments, the capability set can include information relating to codecs (e.g., specifying a mandatory codec like H.264 for high-definition video), content protection (e.g., high-bandwidth digital content protection (HDCP) for the media content), data security (e.g., WPS/WPA2), and so forth.

Upon negotiating the capabilities of the direct wireless connection and/or the media streaming session, the mobile device 110 transmits a session establishment message 440 that confirms the establishment of the session. In some embodiments, the session establishment message includes information that specifies the parameters of the session, including details associated with the direct communication link 120(2) and/or details associated with media that is to be streamed (e.g., media information, media type, etc.).

In some embodiments, the RSE units 102 and/or the head unit can support coupled sink operations (e.g., where the mobile device 110 is a Wi-Fi Direct (WFD) source and the RSE units 102 and/or the head unit are WFD sinks) associated with the mobile device 110 establishing connections with multiple devices (e.g., the RSE unit 102(1) and a head unit). In such instances, a given RSE unit 102(1) and the head unit can complete the coupling process before connecting with the mobile device 110. When completing the coupling process, the RSE unit 102(1) and the head unit can transmit various negotiation messages, such as the discovery messages 412-418, the connection setup messages 432-434, the capability set messages 434-436, and so forth, to couple the RSE unit 102(1) with the head unit.

In some embodiments, the mobile device 110 can optionally send a back channel setup message 442 to the selected RSE 102(2) that indicates a control channel that is to be used to communicate control and data information between the mobile device 110 and the RSE 102(2). For example, the mobile device 110 can identify a user interface back channel (UIBC) that is separate from a media channel used to stream media content. In some embodiments, the RSE 102(2) can send user inputs to the mobile device 110 via the back channel. For example, the user can provide inputs to change the characteristics of the media content (scrubbing through a video, rewinding an audio track, etc.) by interacting with the RSE 102(2). The RSE 102(2) can respond by sending the control messages via the back channel to the mobile device 110.

In various embodiments, the mobile device 110 can optionally send a link content protection message 444 that specifies details about how media content is to be protected during the streaming session. For example, the mobile device 110 could specify in the link content protection message 444 that the direct communication link 120(2) is to use HDCP for content protection while streaming media content.

In various embodiments, the mobile device 110 and the selected RSE unit 102(2) can exchange payload control messages 446, 448 in order to adjust transmission parameters based on factors such as channel conditions and/or power consumption characteristics of the respective devices 110, 102(2). For example, the mobile device 110 could transition into a power-saving mode during the streaming session. In such instances, the mobile device 110 could transmit a payload control message 446 to adjust the parameters of the media being streamed based on the change in the power consumption of the media device 110.

Once the streaming session has been established, the media device 110 transmits a media stream 460 to the selected RSE unit 102(2). In some embodiments, the mobile device 110 can transmit audiovisual (AV) content, audio-only content, and/or image content to the selected RSE unit 102(2) in a media stream 460 via one or more AV streaming messages 462 (e.g., 462(1), 462(2), 462(3), etc.). The RSE unit 102(2) then provides the received content from the media stream 460 via the one or more I/O devices 230, the display device 232, and/or the speakers 234. For example, the mobile device 110 could stream a video received from a wireless source over a separate network (e.g., receiving video from a content distribution network over a mobile wireless network) to the RSE unit 102(2). The RSE unit 102(2) could produce the audio portion of the video via the speakers 234 and/or another audio output device (e.g., audio device types that include headphones, separate loudspeakers, etc.) and could produce the video content via the display device 232.

In various embodiments, the mobile device 110 could serialize the AV streaming messages 462 and can partition the media content into the serialized messages 462. Additionally or alternatively, the mobile device 110 can adjust the size of the payload of the AV streaming messages 462 based on control information specified in the payload control messages 446, 448. In various embodiments, the AV streaming messages 462 can be modified in order to provide security within the direct communications link 120(2) and/or provide protection to the content. For example, the mobile device 110 could encrypt each of the AV streaming messages 462 using HDCP and/or other encryption protocols.

During the streaming session 430, the mobile device 110 and/or the selected RSE unit 102(2) can perform actions 470 (e.g., 470(1), 470(2)) to end the streaming session 430. In various embodiments, the mobile device 110 and/or the selected RSE unit 102(2) can receive a user input to end the streaming session. In some embodiments, the media application 220 and/or the media control application 332 can require confirmation by the user at each device. In such instances, the user can provide separate inputs at each of the mobile device 110 and the selected RSE unit 102(2) in order to indicate that the streaming session is to end. The selected RSE unit 102(2) could then perform various actions 470(1) and the mobile device 110 could perform corresponding actions 470(2) that respond to the received user inputs. Upon receiving a user input to end the streaming session, the RSE unit 102(2) and the mobile device 110 can exchange messages 482, 484 in order to end the streaming session.

Managing Multiple Direct Media Connections

Figure 5:
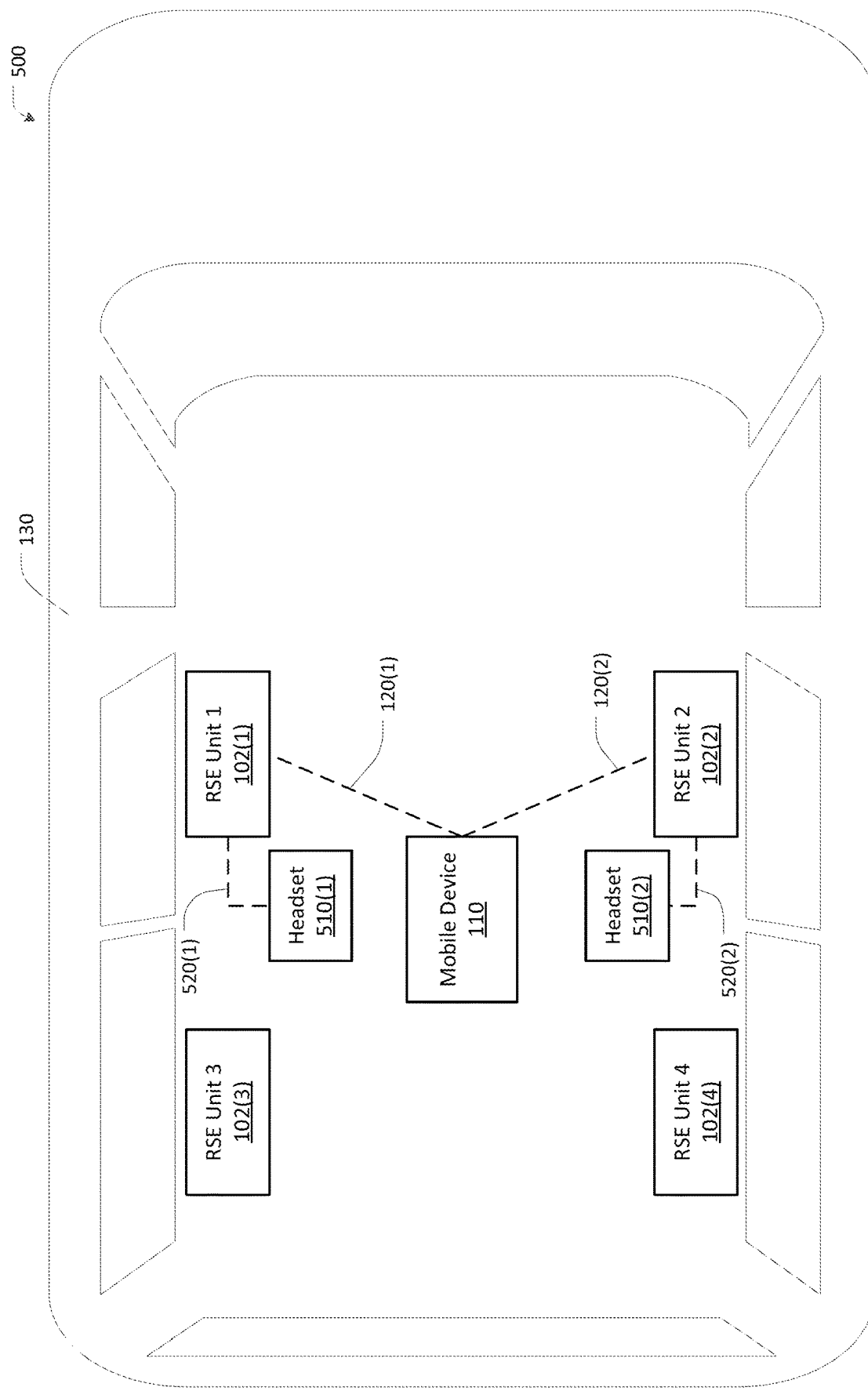
FIG. 5 illustrates an example set of connections established between the mobile device and multiple RSE units in the example direct media communication system of FIG. 1, according to one or more embodiments.

FIG. 5 illustrates an example set of connections established between the mobile device 110 and multiple RSE units 102 in the example direct media communication system 100 of FIG. 1, according to one or more embodiments. As shown, the system 500 includes, without limitation, the vehicle 130, the mobile device 110, the RSE units 102, a set of headsets 510, the direct communications links 120 and audio links 520.

In operation, the mobile device 110 can connect to multiple RSE units 102 concurrently and establish streaming sessions with each of the connected RSE units 102. One or more of the connected RSE units 102 can establish audio links and transmit the audio portions of a stream to a connected device, such as one or more headsets 510.

The headsets 510 (e.g., 510(1), 510(2), etc.) can be an audio output device (e.g., headrest loudspeakers, connected headphones, specific sound zones, etc.) that is connected via a wired or wireless connection to the RSE unit 102. In various embodiments, the headset 510 can use a communications protocol, such as Bluetooth to establish the audio link 520 with a particular RSE unit 102. In such instances, the RSE unit 102 can establish the audio link 520 independently from establishing the direct communications link 120 with the mobile device 110. For example, a user of the headset 510(1) can initially establish the audio link 520(1) with the RSE unit 102(1) before the mobile device 110 initiates the selection process 410. Alternatively, in another example, the RSE unit 102(2) can establish the audio link 520(2) with the headset 510(2) during the streaming session 430.

In various embodiments, during the establishment of the streaming session 430, the mobile device 110 can select multiple RSE units 102 (e.g., 102(1), 102(2). In such instances, the mobile device 110 can separately communicate with the respective selected RSE units 102(1), 102(2) to negotiate the capabilities of the direct wireless connection 120(1), 120(2) and/or the media streaming sessions. For example, the mobile device 110 can transmit multiple capability set request messages 436 that requests a set of optional, recommended, and/or mandatory features of the direct wireless connection and/or the media streaming session.

In various embodiments, a given selected RSE unit 102(1) can respond with the capability set response message 438 that details the selections made by the RSE unit 102(2) to the optional and recommended features, and/or confirmation of compliance with respect to the mandatory features. In some embodiments, the capability set response message 438 can also specify the characteristics of the audio link 520(1). For example, the capability set can include information specifying that the audio link 520(1) is audio-only, the codecs used for the audio link 520(1), and so forth. In some embodiments, the mobile device 110 can confirm the characteristics of the audio link 520(1) when generating the session establishment message 440.

In some embodiments, the mobile device 110 can perform various techniques to synchronize the streaming sessions over the respective links 120, 520. For example, when a first user provides an input to the RSE unit 102(1) to pause playback, the mobile device 110 can respond by pausing playback of the streaming session to the RSE unit 102(2) as well. In other examples, the user can provide other inputs to the RSE unit 102(1) to modify the stream, such as by using various inputs of the interface provided by the RSE unit 102(1) to rewind, fast forward, and/or loop a portion of the AV content. In such instances, the RSE unit 102(1) can transmits message to the mobile device 110 that causes the mobile device 110 to modify one or more other streams provided on separate direct communications links 120 to other RSE units 102.

Additionally or alternatively, in various embodiments, a user of the mobile device 110 can operate one or more of the respective RSE units 102 by providing inputs to the mobile device 110. For example, the user of the mobile device 110 can fast forward through a screen by pressing on the screen of the mobile device 110. In such instances, the mobile device 110 can skip to another time in the AV content and can cause the mobile device 110 to update each stream to jump to the desired point.

Figure 6:
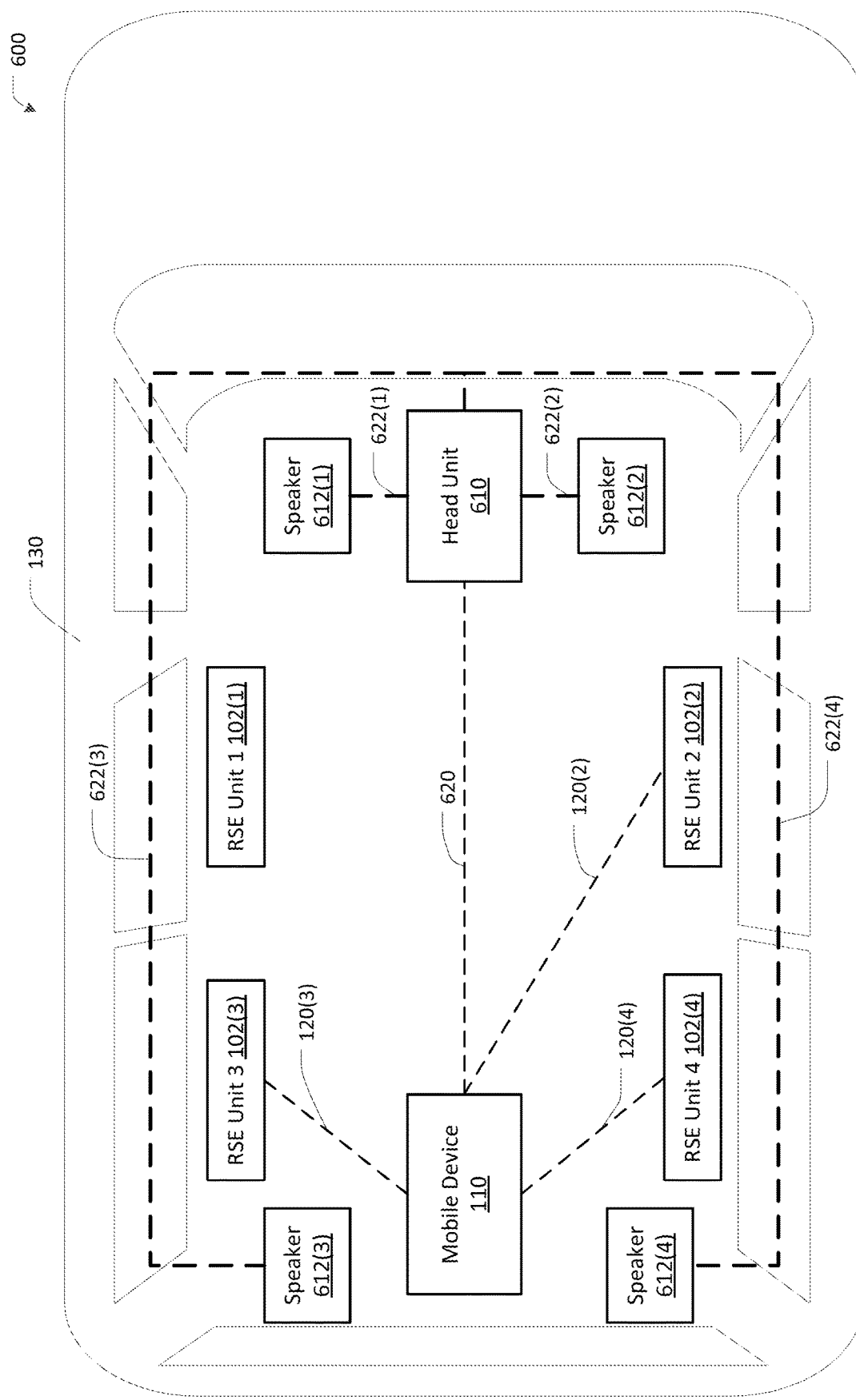
FIG. 6 illustrates an example set of connections established between the mobile device, multiple RSE units, and the head unit in the example direct media communication system of FIG. 1, according to one or more embodiments.

FIG. 6 illustrates an example set of connections established between the mobile device 110, multiple RSE units 102, and a head unit 610 in the example direct media communication system 100 of FIG. 1, according to one or more embodiments. As shown, the system 600 includes, without limitation, the vehicle 130, the mobile device 110, the RSE units 102, the head unit 610, a set of speakers 612, the direct communications links 120 and audio links 622.

In operation, the mobile device 110 can connect to multiple RSE units 102 concurrently and establish streaming sessions with each of the connected RSE units 102. In addition, the mobile device 110 can establish a communications link with the head unit 610. In some embodiments, the mobile device 110 can exchange one or more link content protection messages and/or one or more payload control messages with the head unit 610. The head unit 610 can establish one or more audio links to the respective speakers 612 to playback the audio portion of a stream. In some embodiments, the RSE units 102 and the head unit 610 can support coupled sink operations (e.g., where the mobile device 110 is a Wi-Fi Direct (WFD) source and the RSE units 102 and/or the head unit 610 are WFD sinks) to synchronize the video and/or audio payload transmitted in the respective streams. In such instances, a given RSE unit 102 and the head unit can transmit negotiation messages (e.g., discovery messages 412-418, connection setup messages 432-434, capability set messages 434-436, etc.) to complete the coupling process before connecting with the mobile device 110.

The head unit 610 is a component of the vehicle 130 that is mounted at any location within a passenger compartment of the vehicle 130 in any technically-feasible fashion. In some embodiments, the head unit 610 can include any number and type of instrumentation and applications and can provide any number of input and output mechanisms. For example, the head unit 610 can enable users (e.g., the driver and/or passengers) to control an entertainment subsystem for the vehicle 130. The head unit 610 supports any number of input and output data types and formats, as known in the art. For example, the head unit 610 could include built-in Bluetooth for hands-free calling and/or audio streaming, universal serial bus (USB) connections, speech recognition, video outputs for any number and type of displays, and any number of audio outputs. In general, any number displays, audio outputs, receivers, transmitters, etc., may be integrated into the head unit 610, or may be implemented externally to the head unit 610. In various embodiments, the external devices may communicate with the head unit 610 in any technically-feasible fashion.

The speakers 612 (e.g., 612(1), 612(2), etc.) are one or more audio output devices included in the vehicle that receive audio signals from the head unit 610 via the audio links 622 and reproduces the audio signal. In various embodiments, one or more speakers 612 can be associated with a specific RSE unit 102. For example, the speaker 612(4) can be associated with the RSE unit 102(4). In various embodiments the speakers 612 can be loudspeakers that have wired or wireless connections to the head unit 610.

In various embodiments, during the establishment of the streaming session 430, the mobile device 110 can determine that the user selected a broadcast mode. In such instances, the mobile device 110 can attempt establishing connections with each of the RSE units 102(1)-102(4) identified via the discovery response messages 414, 418. Additionally or alternatively, each of the RSE units 102(1)-102(4) can wait to receive a selection indication at the RSE unit 102 before establishing a direct communications link 120. For example, the RSE unit 102(1) can opt out of a broadcast session by receiving a selection indication from the user that indicates the user is rejecting participation in the broadcast session.

When establishing the communications links 120, 620 with the multiple RSE units 102 and the head unit 610, the mobile device 110 can separately communicate with the respective selected devices and components to negotiate the capabilities of the direct wireless connections and/or the media streaming sessions. For example, the mobile device 110 can transmit multiple capability set request messages 436 to the RSE units 102(2), 102(3), 102(4) and the head unit 610.

In some embodiments, the head unit 610 can respond with a capability set that includes receiving both video and audio portions of the stream. For example, the head unit 610 can provide video content via one or more displays, such as front displays that provide video to the driver and/or the front passenger. In such instances, the head unit 610 can provide a capability set that includes information about displaying visual information via the front displays, as well as information about providing audio via the one or more speakers 612. In such instances, the mobile device 110 can provide an audio stream and/or a video stream over the direct communications link 620 to the head unit and the head unit can provide corresponding audio streams via the one or more audio links 622 to the one or more speakers 612.

Alternatively, the head unit 610 can respond with a capability set indicating that the head unit 610 is only to receive the audio portion of the stream. For example, the head unit 610 can control subsets of the speakers 612 as seat-specific loudspeakers, personalized sound zones, etc., for one or more seats within the vehicle 130. In such instances, the head unit 610 can provide a capability set that indicates separate audio options for one or more areas of the vehicle 130 and the mobile device 110 can provide the options to the one or more selected RSE units 102 in order to specify the particular audio output device (e.g., headset 510, speaker 612) and the particular device that will forward the audio stream to the audio output device. In some embodiments, the head unit 610 can control one or more of the speakers 612 when in broadcast mode. For example, the head unit 610 can provide audio streams via audio links 622(1)-622(4) to each speaker 612(1)-612(4) when the mobile device 110 is operating in the broadcast mode.

Techniques for Managing Direct Media Connections

Figure 7:
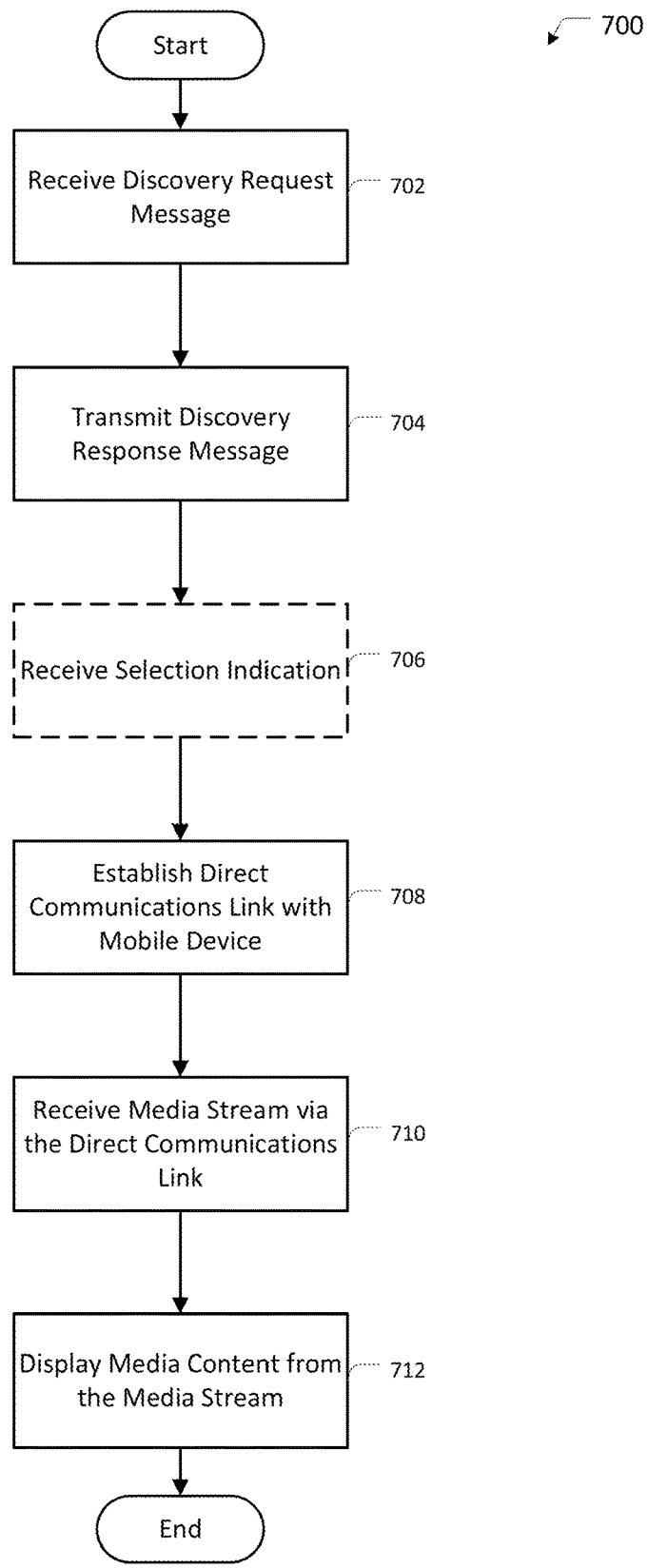
FIG. 7 sets forth a flow chart of method steps for streaming media content by a rear-seat entertainment unit that is included in the direct media communication system of FIG. 1 via a direct connection to a mobile device, according to one or more embodiments.

FIG. 7 sets forth a flow chart of method steps for streaming media content by a rear-seat entertainment unit that is included in the direct media communication system of FIG. 1 via a direct connection to a mobile device, according to one or more embodiments. Although the method steps are described with respect to the systems of FIGS. 1-6, persons skilled in the art will understand that any system configured to perform the method steps, in any order, falls within the scope of the various embodiments.

As shown, the method 700 begins at step 702, where an RSE unit 102 receives a discovery request message. In various embodiments, a given RSE unit 102(2) in a vehicle 130 can receive a discovery request message 416 that is transmitted by a mobile device 110 proximate to the RSE unit 102(2). In various embodiments, the RSE unit 102(2) and the mobile device 110 can be members of the same Wi-Fi network. In some embodiments, the discovery request message 416 can be based on a specific type of connection link that the mobile device 110 is attempting to establish. For example, the discovery request message 416 can be a Wi-Fi Direct Device discovery request message associated with establishing a Wi-Fi P2P connection link.

At step 704, the RSE unit 102(2) transmits a discovery response message 418. In various embodiments, the RSE unit 102(2) can transmit a discovery response message 418 that responds to the received discovery request message 416, where the discovery response message 418 indicates that the RSE unit 102(2) is available for establishing a direct communication link.

At step 706, the RSE unit 102(2) can optionally receive a selection indication. In some embodiments, the RSE unit 102(2) can receive a user input associated with an indication that the RSE unit 102(2) is to establish a direct communications link 120(2) with the mobile device 110. In such instances, the RSE unit 102(2) can respond by proceeding to step 708.

At step 708, the RSE unit 102(2) performs various actions associated with establishing the direct communications link 120(2) and establishing a media streaming session from the mobile device 110. In some embodiments, the RSE unit 102(2) and mobile device 110 can exchange various messages 432-448 in order to establish the parameters of the streaming session. For example, the RSE unit 102(2) and the mobile device 110 can negotiate the capability set of the direct communications link 120(2), establish a back channel to provide control messages, and/or determine the parameters for content protection and the composition of the payload that is used to stream the media content.

At step 710, the RSE unit 102(2) receives a stream of media content. In various embodiments, the RSE unit 102(2) receives a media stream 460 over the established direct communications link 120(2). At step 712, the media application 220 included in the RSE unit 102(2) provides the content of the media stream 460 via one or more I/O devices 230. In various embodiments, the media application 220 can process the payload of a set of AV streaming message 462 and can provide the content of the payload via the display device 232 and speakers 234 and/or one or more I/O devices 230.

Figure 8:
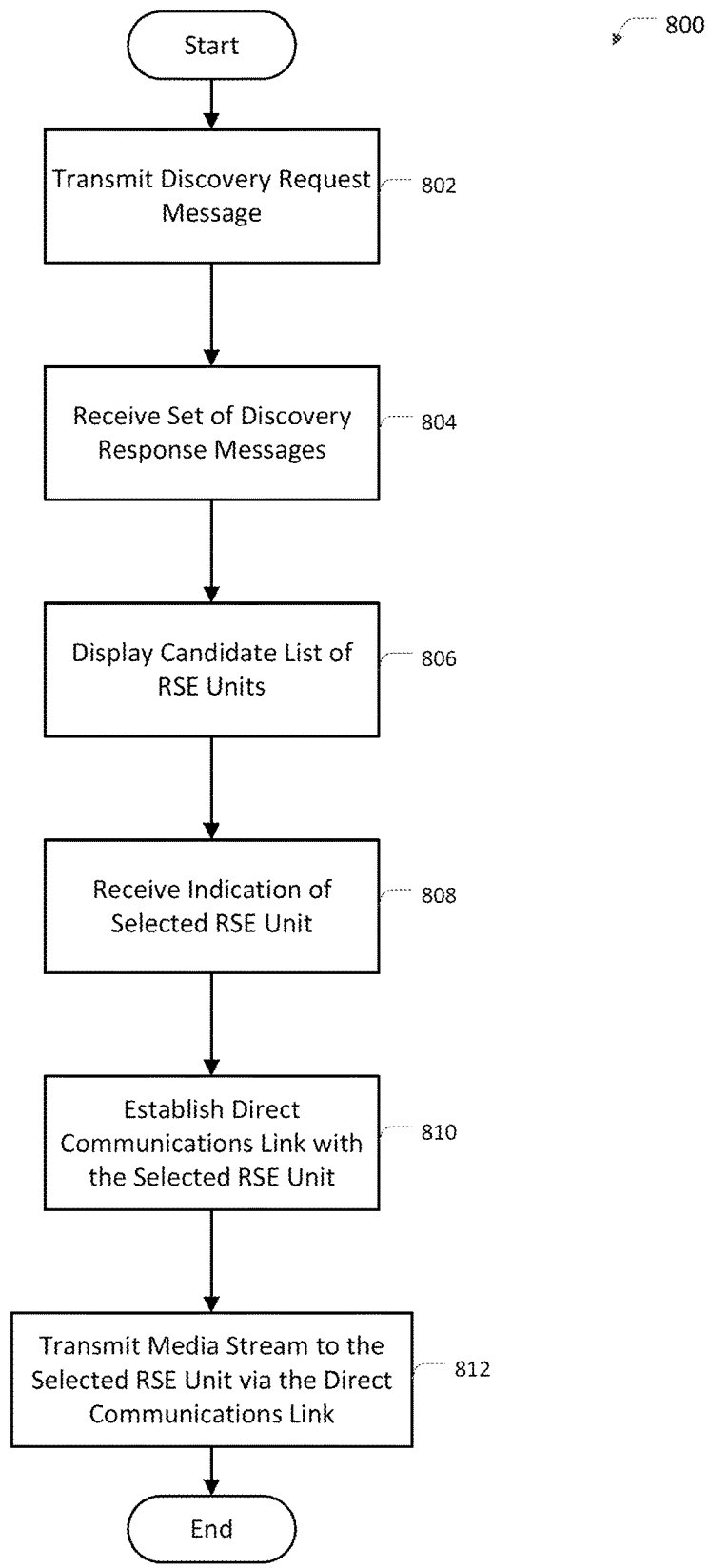
FIG. 8 sets forth a flow chart of method steps for providing streaming media content by a mobile device that is included in the example direct media communication system of FIG. 1 to a rear-seat entertainment unit via a direct connection, according to one or more embodiments.

FIG. 8 sets forth a flow chart of method steps for providing streaming media content by a mobile device that is included in the example direct media communication system of FIG. 1 to a rear-seat entertainment unit via a direct connection, according to one or more embodiments. Although the method steps are described with respect to the systems of FIGS. 1-6, persons skilled in the art will understand that any system configured to perform the method steps, in any order, falls within the scope of the various embodiments.

As shown, the method 800 begins at step 802, where a mobile device 110 sends one or more discovery request messages. In various embodiments, the mobile device 110 can send one or more discovery request messages 412, 416 in order to identify a device with which to establish a direct wireless connection. For example, the mobile device 110 could respond to a user input to connect to a nearby RSE unit 102 by transmitting one or more discovery request messages 412, 416 in order to identify one or more RSE units 102 proximate to the mobile device 110 that are available for a direct wireless connection.

At step 804, the mobile device 110 receives one or more discovery response messages. In various embodiments, the mobile device 110 can receive one or more discovery response messages 414, 418 from one or more RSE units 102 indicating that the respective RSE units are available for a streaming session. In some embodiments, the quantity of discovery response messages may not match the quantity of discovery request messages that the mobile device 110 transmitted. In such instances, the mobile device 110 can determine that at least one RSE unit 102 is not available for establishing a session.

At step 806, the mobile device 110 displays a candidate list of RSE units 102. In various embodiments, the mobile device 110 can process the received discovery response messages 414, 418 and can display a candidate list of RSE units 102 to which the mobile device 110 can establish a direct connection. In some embodiments, the mobile device 110 can order the devices listed in the candidate list using various criteria, such as response time, estimated distance to the mobile device 110, estimated connection strength, hardware capabilities of the respective RSE units 102 (e.g., audio output device, display screen resolution, etc.), and so forth. In such instances, the media control application 332 could order the candidate list by sorting the most-likely RSE units 102 in descending order based on one or more of the criteria.

At step 808, the mobile device 110 receives an indication of a selection made by the user. In various embodiments, the mobile device 110 can receive a user input that indicates a selection of a specific RSE unit 102 (e.g., 102(2)) from the RSE units 102 listed in the candidate list.

At step 810, the mobile device 110 establishes a direct wireless connection with the selected RSE unit 102. In various embodiments, the mobile device 110 can exchange various messages with the selected RSE unit 102(2) in order to establish a streaming session. For example, the mobile device 110 could transmit various messages 432-448 with the selected RSE unit 102(2) in order to set up the direct communications link 120(2) with a specific set of characteristics. Such messages could include capability set messages 436, 438 to determine the capability set of the direct communications link 120(2) that is to be established, back channel setup messages 442 to establish a back channel to provide control messages, content protection messages 444 specifying parameters for content protection, payload control messages 446, 448 to control composition of the payload that is used to stream the media content, and so forth.

At step 812, the mobile device 110 can stream media content via the direct wireless connection. In various embodiments, the mobile device 110 can transmit a media stream 460 to the selected RSE unit 102(2) over the established direct communications link 120(2). The RSE unit 102(2) can provide the content from the media stream 460 via one or more I/O devices 230, display device 232, and/or speakers 234. In some embodiments, the mobile device 110 can stream media content that is received from a different wireless source via a separate network (e.g., receiving video from a content distribution network over a mobile wireless network). Additionally or alternatively, the media device 110 could transmit media content that is stored in its memory subsystem 330 (e.g., an audio file stored in internal data store 334).

Figure 9:
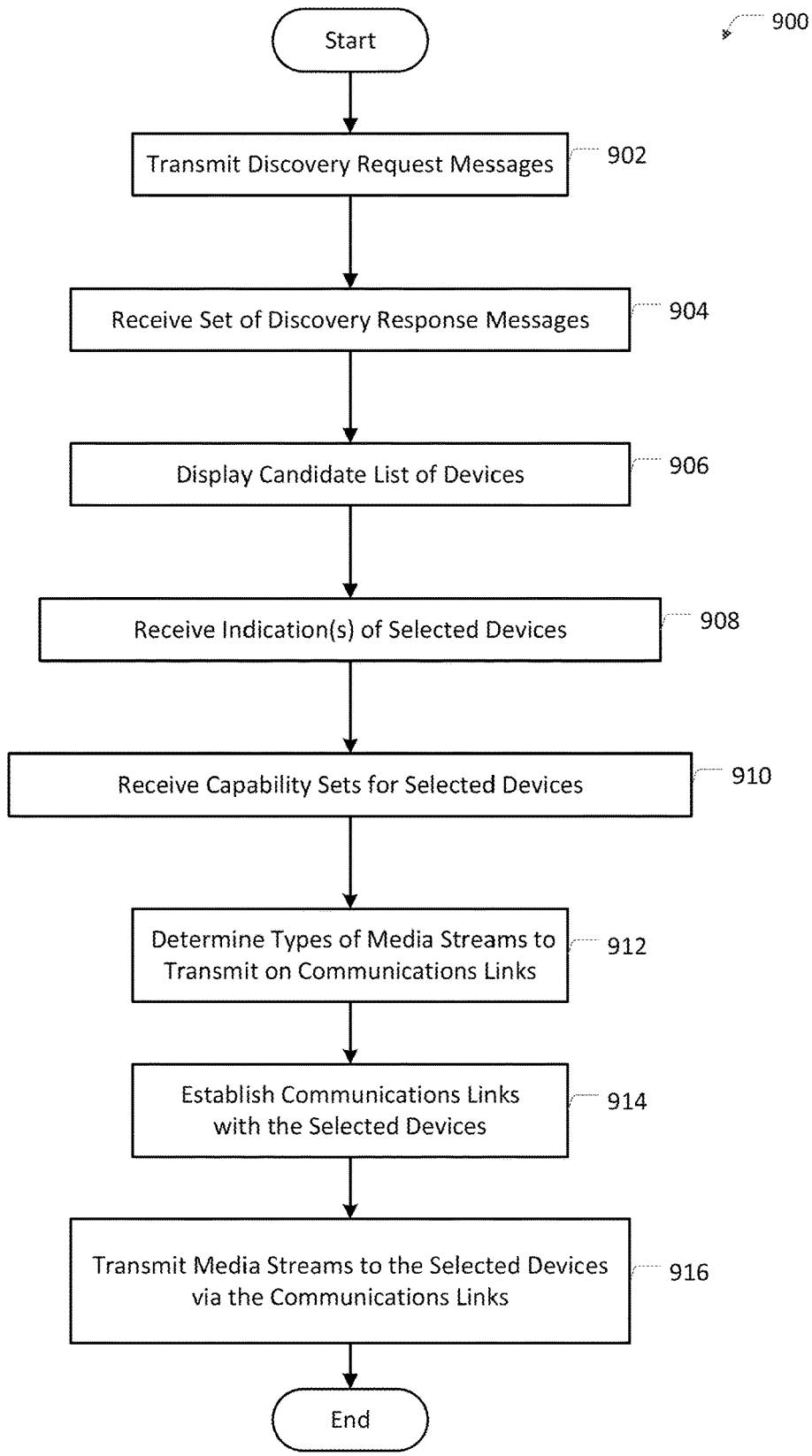
FIG. 9 sets forth a flow chart of method steps for providing streaming media content by a mobile device that is included in the example direct media communication system of FIG. 1 to multiple devices via multiple connections, according to one or more embodiments.

FIG. 9 sets forth a flow chart of method steps for providing streaming media content by a mobile device that is included in the example direct media communication system of FIG. 1 to multiple devices via multiple connections, according to one or more embodiments. Although the method steps are described with respect to the systems of FIGS. 1-6, persons skilled in the art will understand that any system configured to perform the method steps, in any order, falls within the scope of the various embodiments.

As shown, the method 900 begins at step 902, where here a mobile device 110 sends one or more discovery request messages to identify one or more devices or components with which to establish a direct wireless connection. For example, the mobile device 110 can transmit one or more discovery request messages 412, 416 in order to identify one or more RSE units 102, and/or the head unit 610 that are proximate to the mobile device 110 that are available for a direct wireless connection.

At step 904, the mobile device 110 receives a set of discovery response messages. In various embodiments, the mobile device 110 can receive a set of one or more discovery response messages 414, 418 from the respective devices can components that indicate availability for a streaming session. In some embodiments, the quantity of discovery response messages may not match the quantity of discovery request messages that the mobile device 110 transmitted. In such instances, the mobile device 110 can determine that at least one RSE unit 102 is not available for establishing a session.

At step 906, the mobile device 110 displays a candidate list of devices. In various embodiments, the mobile device 110 can process the received discovery response messages 414, 418 and can display a candidate list of devices to which the mobile device 110 can establish a direct wireless connection. In some embodiments, the mobile device 110 can order the devices listed in the candidate list using various criteria, such as response time, estimated distance to the mobile device 110, estimated connection strength, hardware capabilities of the respective RSE units 102 (e.g., audio output device, display screen resolution, etc.), and so forth. In such instances, the media control application 332 could order the candidate list by sorting the most-likely candidate devices for connection in descending order based on one or more of the criteria.

At step 908, the mobile device 110 receives one or more indication(s) of selection(s) made by the user. In various embodiments, the mobile device 110 can receive one or more user inputs that indicates one or more selections of specific devices (e.g., the RSE units 102(2), 102(4), the head unit 610, etc.) from the devices listed in the candidate list. In some embodiments, the candidate list can include devices that forward portions of the streams to other devices not listed in the candidate list. For example, the candidate list can include an entry listing the head unit 610, where the head unit 610 connects to one or more speakers 612 that are not included in the candidate list. Additionally or alternatively, the mobile device 110 can receive an indication of a specific connection mode, such as a broadcast mode that attempts to establish connections with each identified device. In such instances, the mobile device 110 can respond to the mode selection by identifying a set of devices as the selected devices.

At step 910, the mobile device 110 receives the capability sets for the selected devices. In various embodiments, the mobile device 110 can exchange various messages with the selected devices in order to establish a streaming session. For example, the mobile device 110 could transmit various messages 436-438 with the selected RSE units 102 and/or the head unit 610 in order to set up the direct communications links 120, 620. In such instances, the mobile device 110 can use the respective capability sets to establish direct communications links 120, 620 having a specific set of characteristics. For example, a selected RSE unit 102(2) can include characteristics of an audio link 520(2) the selected RSE unit 102(2) has been established with a wireless headset 510(2).

At step 912, the mobile device 110 determines the types of media streams to transmit over the communications links. In various embodiments, the mobile device 110 can determine the characteristics of a streaming session based on the capability sets that the mobile device 110 receives from the selected devices. For example, the mobile device 110 can determine to stream video to each of the selected devices (e.g., the RSE units 102(1), 102(2), the head unit 610). In some embodiments, the mobile device 110 can receive a capability set specifying a specific portion of the stream that the device is capable of receiving. For example, the mobile device 110 can receive a capability set from the head unit 610 specifying that the head unit 610 is to receive only the audio portion of the stream (such as when the head unit 610 controls the set of speakers 612 while front displays for the front-row users are off). In such instances, the mobile device 110 can determine that an audio-only stream is to be provided over the direct communications link 620 when established.

In some embodiments, the recipient devices can determine a specific portion of the stream to provide to other devices. For example, the RSE unit 102(2) can establish the audio link 520(2) to the headset 510(2) independently from the mobile device 110 establishing the direct communications link 120 with the RSE unit 102(2). In such instances, the RSE unit 102(2) can include information about the audio link as a part of the capability set that the RSE unit 102(2) transmits to the mobile device 110. The mobile device 110 can determine from the capability set that the RSE unit 102(2) will provide an audio-only stream to the headset 510(2) during the streaming session.

At step 914, the mobile device 110 establishes communications links with the respective devices. In various embodiments, the mobile device 110 can establish one or more direct communications links 120, 620 with each of the respective selected devices based on the determined capability sets. For example, the mobile device can send one or more messages 440-448 to establish a direct communications link 120, 620 with a device during a streaming session 430.

At step 916, the mobile device 110 transmits media streams to the selected devices via the communications links. In various embodiments, upon determining the types of media streams to use on each of the respective direct communications links 120, 620, that the mobile device 110 can stream media content via the direct wireless connections. In various embodiments, the mobile device 110 can transmit a media stream 460 to a given device over the established direct communications link.

In various embodiments, the recipient device can provide the content from the media stream 460 to other devices via additional links. In some embodiments, a device such as the RSE unit 120 or the head unit 610 can provide the entire stream to another device or a portion of the stream to another device For example, the RSE unit 102(1) can receive AV content that includes an audio portion and a video portion. In such instances, the RSE unit 102(1) can provide the audio portion of the AV content as audio content via the audio link 520(1) to the headset 510(1). In another example, the head unit 610 can receive the audio portion of the content via the direct communications link 620 and can transmit audio content to the speakers 612 via audio links 622. In some examples, the head unit 610 can additionally receive the video portion of the AV content and transmit the video portion to one or more connected displays.

In sum, a mobile device attempts to establish a direct wireless connection with at least one rear-seat entertainment (RSE) unit. The mobile device transmits one or more discovery messages that are received by a set of one or more RSE units that are proximate to the mobile device. The mobile device receives one or more discovery response messages from the set of RSE units and displays a list of candidate RSE units to which the mobile device could establish a direct wireless connection. In some embodiments, the mobile device orders the list of RSE units based on one or more criteria, such as distance, strength of connection, transmission delay, and so forth. In some embodiments, the mobile device can predict an order of the most likely RSE unit to be selected for connection and can order the list based on the predicted order.

Once the mobile device receives an indication of one or more selected RSE units, each of the respective selected RSE units and the mobile device establish a direct wireless connection. In various embodiments, when establishing a connection, a respective selected RSE unit and the mobile device can exchange messages associated with the capability set of the selected RSE unit, security protocols that are to be used to protect the direct wireless connection, and an optional back channel to setup between the selected RSE unit and the mobile device. Upon determining the settings for the direct wireless connection, the selected RSE and the mobile device establish a direct connection session, where the mobile device periodically streams media content via the direct connection by sending sets of messages that contain the media content in the payload.

At least one technological advantage of the disclosed approach relative to the prior art is that establishing a direct media connection between a mobile device and a rear-seat entertainment unit reduces the complexity and cost of connecting the devices through a middle link unit, such as a head end unit. Further, by providing the user with a list of candidate RSE units with which a mobile device can connect, the direct media communication system provides a user with greater control to connect to a specific RSE unit within a group of units without control via a head unit that is typically positioned in an inconvenient location for the user. In addition, a system employing the disclosed approach enables a user to directly manage the output of a connected RSE unit without the use of a centralized head unit. These technical advantages provide one or more technological advancements over prior art approaches.

1. In various embodiments, a computer-implemented method comprises transmitting, by a mobile device, a discovery request message, identifying, based on a set of discovery response messages associated with the discovery request message, a set of rear-seat entertainment (RSE) units that are available for establishing a direct wireless communications link, generating a first direct wireless communications link with a first RSE unit from the set of RSE units, and streaming, from the mobile device to the first RSE unit via the first direct wireless communications link, media content for playback by the first RSE unit.

2. The computer-implemented method of clause 1, further comprising generating a candidate list that includes the set of RSE units, where the candidate list includes the first RSE unit and at least a second RSE unit.

3. The computer-implemented method of clause 1 or 2, further comprising sorting the set of RSE units included in the candidate list based on at least one sorting criterion, where the at least one sorting criterion includes at least one of distance of a given RSE unit to the mobile device, response time of the given RSE unit to the discovery request message, a display resolution of the given RSE unit, or an audio device type of the given RSE unit.

4. The computer-implemented method of any of clauses 1-3, further comprising receiving indications that select at least two devices from the candidate list, where the indications identify the first RSE unit and the second RSE unit as selections, generating a second direct wireless communications link with the second RSE unit, and streaming, from the mobile device to the second RSE unit via the second direct wireless communications link, media content for playback by the second RSE unit.

5. The computer-implemented method of any of clauses 1-4, further comprising identifying, based on a first discovery response message included in the set of discovery response messages, a vehicle head unit that is available for establishing a direct wireless communications link, generating a second direct wireless communications link with the vehicle head unit, and streaming, from the mobile device to the vehicle head unit via the first direct wireless communications link, media content for playback by one or more devices linked to the vehicle head unit.

6. The computer-implemented method of any of clauses 1-5, where the media content streamed via the first direct wireless communications link includes video content, and the media content streamed via the second direct wireless communications link is audio-only content.

7. The computer-implemented method of any of clauses 1-6, where the first direct wireless communications link comprises a Wi-Fi peer-to-peer (P2P) connection.

8. The computer-implemented method of any of clauses 1-7, further comprising receiving, by the mobile device from a source via a second wireless communications link, the media content, where the second wireless communications link is associated with a network that does not include the first direct wireless communications link.

9. The computer-implemented method of any of clauses 1-8, where generating the first direct wireless communications link comprises sending, by the mobile device, a capability set request message that identifies a set of optional features for the first direct wireless communications link, and receiving, from the first RSE unit, a capability set response message that indicates selections associated with each of the set of optional features.

10. The computer-implemented method of any of clauses 1-9, where the first direct wireless communications link is included in a first Wi-Fi network, and the mobile device is a group owner in the first Wi-Fi network.

11. In various embodiments, one or more non-transitory computer-readable media storing instructions that, when executed by one or more processors, cause the one or more processors to perform the steps of transmitting, by a mobile device, a discovery request message, identifying, based on a set of discovery response messages associated with the discovery request message, a set of rear-seat entertainment (RSE) units that are available for establishing a direct wireless communications link, generating a first direct wireless communications link with a first RSE unit from the set of RSE units, and streaming, from the mobile device to the first RSE unit via the first direct wireless communications link, media content for playback by the first RSE unit.

12. The one or more non-transitory computer-readable media of clause 11, further comprising instructions that, when executed by the one or more processors, cause the one or more processors to perform the step of generating a candidate list of the set of RSE units, where the candidate list includes the first RSE unit and at least a second RSE unit.

13. The one or more non-transitory computer-readable media of clause 11 or 12, further comprising instructions that, when executed by the one or more processors, cause the one or more processors to perform the step of sorting the set of RSE units included in the candidate list based on at least one sorting criterion, where the at least one sorting criterion includes at least one of distance of a given RSE unit to the mobile device, response time of the given RSE unit to the discovery request message, a display resolution of the given RSE unit, or an audio device type of the given RSE unit.

14. The one or more non-transitory computer-readable media of any of clauses 11-13, where the mobile device and the first RSE unit are members of a first Wi-Fi network, and the first direct wireless communications link comprises a Wi-Fi peer-to-peer (P2P) connection.

15. The one or more non-transitory computer-readable media of any of clauses 11-14, where generating the first direct wireless communications link comprises sending, by the mobile device, a capability set request message that identifies a set of optional features for the first direct wireless communications link, and receiving, from the first RSE unit, a capability response message that indicates selections associated with each of the set of optional features.

16. In various embodiments, a rear-seat entertainment (RSE) system comprises one or more output devices to provide media content, a memory storing a media application, and a processor that executes the media application by performing the steps of receiving a discovery request message transmitted from a mobile device proximate to the RSE system, transmitting a discovery response message to the discovery request message, establishing a first direct wireless communications link with the mobile device, receiving, from the mobile device via the first direct wireless communications link, a stream of the media content, and providing, the stream of the media content via the one or more output devices.

17. The RSE system of clause 16, where the first direct wireless communications link comprises a Wi-Fi peer-to-peer (P2P) connection.

18. The RSE system of clause 16 or 17, further comprising a network module that establishes the direct first wireless communications link, wherein the network module is included in an external device that is connected to the processor via a connection port.

19. The RSE system of any of clauses 16-18, where the RSE system and the mobile device are members of a first Wi-Fi network, and the first direct wireless communications link comprises a Wi-Fi peer-to-peer (P2P) connection.

20. The RSE system of any of clauses 16-19, where the first direct wireless communications link is included in a first Wi-Fi network, and the RSE system is a group owner in the first Wi-Fi network.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments can be embodied as a system, method or computer program product. Accordingly, aspects of the present disclosure can take the form of an entirely hardware embodiment, an entirely software embodiment (including firmware, resident software, microcode, etc.) or an embodiment combining software and hardware aspects that can all generally be referred to herein as a "module," a "system," or a "computer." In addition, any hardware and/or software technique, process, function, component, engine, module, or system described in the present disclosure can be implemented as a circuit or set of circuits. Furthermore, aspects of the present disclosure can take the form of a computer program product embodied in one or more computer readable medium(s) having computer readable program code embodied thereon.

Any combination of one or more computer readable medium(s) can be utilized. The computer readable medium can be a computer readable signal medium or a computer readable storage medium. A computer readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium can be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors can be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams can represent a module, segment, or portion of code, which comprises one or more executable instructions for implementing the specified logical function (s). It should also be noted that, in some alternative implementations, the functions noted in the block can occur out of the order noted in the figures. For example, two blocks shown in succession may, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure can be devised without departing from the basic scope thereof, and the scope thereof is determined by the claims that follow.

What is claimed is:

1. A computer-implemented method comprising:
    transmitting, by a mobile device, a discovery request message generated based on input made by a user of the mobile device to initiate streaming to a rear-seat entertainment (RSE) unit;
    identifying, based on a set of discovery response messages associated with the discovery request message, a set of RSE units that are available for establishing a direct wireless communications link;
    determining, based on the set of discovery response messages, a response time to the discovery request message for each RSE unit in the set of RSE units;
    computing, based on the response time for each RSE unit in the set of RSE units, a probability value that the user of the mobile device will select the RSE unit to establish a connection;
    sorting the set of RSE units based on the computed probability value of each RSE unit in the set of RSE units;
    presenting, to a user of a mobile device, the sorted set of RSE units;
    receiving, from the user, a selection of a first RSE unit from the set of RSE units;
    generating a first direct wireless communications link with the first RSE unit; and
    streaming, from the mobile device to the first RSE unit via the first direct wireless communications link, media content for playback by the first RSE unit.

2. The computer-implemented method of claim 1, wherein sorting the set of RSE units is further based on at least one sorting criterion selected from a group consisting of a display resolution of a given RSE unit, a connection strength of the given RSE, and an audio device type of the given RSE unit.

3. The computer-implemented method of claim 1, further comprising:
    receiving indications that select at least two devices from the sorted set of RSE units, wherein the indications identify the first RSE unit and a second RSE unit as selections;
    generating a second direct wireless communications link with the second RSE unit; and
    streaming, from the mobile device to the second RSE unit via the second direct wireless communications link, media content for playback by the second RSE unit.

4. The computer-implemented method of claim 1, further comprising:
    identifying, based on a first discovery response message included in the set of discovery response messages, a vehicle head unit that is available for establishing a direct wireless communications link;

generating a second direct wireless communications link with the vehicle head unit; and streaming, from the mobile device to the vehicle head unit via the second direct wireless communications link, media content for playback by one or more devices linked to the vehicle head unit.

5. The computer-implemented method of claim 4, wherein:

the media content streamed via the first direct wireless communications link includes video content, and the media content streamed via the second direct wireless communications link is audio-only content.

6. The computer-implemented method of claim 1, wherein the first direct wireless communications link comprises a Wi-Fi peer-to-peer (P2P) connection.

7. The computer-implemented method of claim 1, further comprising:

receiving, by the mobile device from a source via a second wireless communications link, the media content, wherein the second wireless communications link is associated with a network that does not include the first direct wireless communications link.

8. The computer-implemented method of claim 1, wherein generating the first direct wireless communications link comprises:

sending, by the mobile device, a capability set request message that identifies a set of optional features for the first direct wireless communications link; and receiving, from the first RSE unit, a capability set response message that indicates selections associated with each of the set of optional features.

9. The computer-implemented method of claim 1, wherein:

the first direct wireless communications link is included in a first Wi-Fi network; and the mobile device is a group owner in the first Wi-Fi network.

10. The computer-implemented method of claim 1, further comprising:

forming, by the mobile device, a new group;

assigning the mobile device as a group owner; and transmitting a connection setup message to establish a Wi-Fi peer-to-peer (P2P)-based direct communications link to be used for streaming media content.

11. The computer-implemented method of claim 1, further comprising:

establishing, by the first RSE unit, an audio link to a headset independently from establishing the first direct wireless communications link with the first RSE unit.

12. One or more non-transitory computer-readable media storing instructions that, when executed by one or more processors, cause the one or more processors to perform the steps of:

transmitting, by a mobile device, a discovery request message generated based on input made by a user of the mobile device to initiate streaming to a rear-seat entertainment (RSE) unit;

identifying, based on a set of discovery response messages associated with the discovery request message, a set of RSE units that are available for establishing a direct wireless communications link;

determining, based on the set of discovery response messages, a response time to the discovery request message for each RSE unit in the set of RSE units;

computing, based on the response time for each RSE unit in the set of RSE units, a probability value that the user of the mobile device will select the RSE unit to establish a connection;

sorting the set of RSE units based on the computed probability value of each RSE unit in the set of RSE units;

presenting, to a user of a mobile device, the sorted set of RSE units;

receiving, from the user, a selection of a first RSE unit from the set of RSE units;

generating a first direct wireless communications link with the first RSE unit; and streaming, from the mobile device to the first RSE unit via the first direct wireless communications link, media content for playback by the first RSE unit.

13. The one or more non-transitory computer-readable media of claim 12, wherein sorting the set of RSE units is further based on at least one sorting criterion selected from a group consisting of a display resolution of a given RSE unit, a connection strength of the given RSE, and an audio device type of the given RSE unit.

14. The one or more non-transitory computer-readable media of claim 12, wherein:

the mobile device and the first RSE unit are members of a first Wi-Fi network; and the first direct wireless communications link comprises a Wi-Fi peer-to-peer (P2P) connection.

15. The one or more non-transitory computer-readable media of claim 12, wherein generating the first direct wireless communications link comprises:

sending, by the mobile device, a capability set request message that identifies a set of optional features for the first direct wireless communications link; and receiving, from the first RSE unit, a capability response message that indicates selections associated with each of the set of optional features.

16. A rear-seat entertainment (RSE) system comprising:
one or more output devices to provide media content;
a memory storing a media application; and
a processor that executes the media application by performing the steps of:

receiving a discovery request message transmitted from a mobile device proximate to the RSE system;

transmitting a first discovery response message to the discovery request message generated based on input made by a user of the mobile device to initiate streaming to an RSE unit, wherein the mobile device:

identifies, based on a set of discovery response messages including the first discovery response message, a set of RSE systems that includes the RSE system, determines, based on the set of discovery response messages, a response time to the discovery request message for each RSE unit in the set of RSE units, computes, based on the response time for each RSE unit in the set of RSE units, a probability value that the user of the mobile device will select the RSE unit to establish a connection, sorts the set of RSE systems based on the computed probability value of each RSE system in the set of RSE systems, presents the sorted set of RSE systems to a user of the mobile device, and receives, from the user, a selection of the RSE system from the set of RSE systems;

establishing a first direct wireless communications link with the mobile device;

receiving, from the mobile device via the first direct wireless communications link, a stream of the media content; and providing, the stream of the media content via the one or more output devices.

17. The RSE system of claim 16, wherein the first direct wireless communications link comprises a Wi-Fi peer-to-peer (P2P) connection.

18. The RSE system of claim 16, further comprising a network module that establishes the direct first wireless communications link, wherein the network module is included in an external device that is connected to the processor via a connection port.

19. The RSE system of claim 16, wherein:

the RSE system and the mobile device are members of a first Wi-Fi network; and the first direct wireless communications link comprises a Wi-Fi peer-to-peer (P2P) connection.

20. The RSE system of claim 16, wherein:

the first direct wireless communications link is included in a first Wi-Fi network; and the RSE system is a group owner in the first Wi-Fi network.

* * * * *